United States Patent
Tanartkit et al.

(10) Patent No.: US 7,463,940 B2
(45) Date of Patent: Dec. 9, 2008

(54) MULTIPLE MODEL DEVELOPMENT USING SUBFLOWSHEET FUNCTIONALITY

(75) Inventors: Purt Tanartkit, Yorba Linda, CA (US); Rahul Sheth, Irvine, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 11/393,502

(22) Filed: Mar. 30, 2006

(65) Prior Publication Data

US 2007/0239293 A1    Oct. 11, 2007

(51) Int. Cl.
*G06F 17/00* (2006.01)
*G06F 19/00* (2006.01)

(52) U.S. Cl. .......................... 700/100; 700/90; 700/28; 700/29; 703/1

(58) Field of Classification Search .............. 700/100, 700/90, 28, 29, 97; 703/22, 1, 6, 5
See application file for complete search history.

(56) References Cited

U.S. PATENT DOCUMENTS

| | | | |
|---|---|---|---|
| 6,442,515 B1* | 8/2002 | Varma et al. | 703/22 |
| 2005/0222698 A1* | 10/2005 | Eryurek et al. | 700/90 |
| 2006/0190105 A1* | 8/2006 | Hsu et al. | 700/86 |

* cited by examiner

*Primary Examiner*—Zoila E. Cabrera
*Assistant Examiner*—Nathan Laughlin
(74) *Attorney, Agent, or Firm*—Cooley Godward Kronish LLP

(57) ABSTRACT

A system and method for modeling industrial processes is described. One embodiment includes collecting a plurality of flowsheets, which include corresponding groups of unit models and combining the plurality of flowsheets to create a combined model. In addition, a first macro associated with a first flowsheet is initiated and other macros by the same name as the first macro are automatically executed. In variations, the other macros are executed from a lowest hierarchical level flowsheet relative to the first flowsheet to a higher hierarchical level until the first macro is run.

7 Claims, 10 Drawing Sheets

MULTIPLE MODEL DEVELOPMENT USING SUBFLOWSHEET FUNCTIONALITY

FIELD OF THE INVENTION

The present invention relates to systems and methods for analyzing process models. In particular, but not by way of limitation, the present invention relates to systems and methods for enabling modular development, deployment and maintenance of plant process models.

BACKGROUND OF THE INVENTION

Process modeling systems have been used in process industries such as refining and pharmaceutical manufacturing for many purposes. Process engineers use these systems to design and evaluate new processes, redesign, retrofit and/or optimize existing process plants. U.S. Pat. No. 6,442,515, which is incorporated herein by reference, discloses one example of such a process modeling system that may be used in different application modes such as simulation, data reconciliation, and optimization.

Some modeling systems use process models, also called flowsheet models, to represent complex real-world systems like process plants or refineries. A flowsheet model is composed of individual units connected by streams and may have an identity associated with the flowsheet. Units may be either a process or a non-process units. A process unit is an item of operating hardware such as a heat exchanger or a pump. A non-process unit is something other than an item of operating hardware, typically a passive device. For example, a non-process unit may represent a flow meter, thermocouple or pressure gauge.

As the size and complexity of flowsheets have increased to model large-scale systems, the need to enable modular, possibly parallel development of the flowsheets has become increasingly important. The ability to modularize process modeling systems has several advantages. Manufacturing facilities are logically organized with modularity and hierarchy. For example, a facility is comprised of plants, plants contain units, and units contain areas. More often than not, work processes in an enterprise are direct consequences of such modularity and hierarchy. Implementing a model structure that reflects such modularity and hierarchy is a strong enabler for model-centric business processing.

Also, large degrees of repetition and parallelism—such as multiple furnaces—exists in manufacturing facilities. Such parallelism is not restricted to a single unit operation model in a model library. The ability to develop a model fragment representing a group of unit operations and process streams—that can be placed repeatedly in an assembly—can reduce efforts required for modeling large-scale facilities with repetitive/parallel constructs. There are distinct maintenance efficiencies in breaking-down complex models into several smaller and more manageable models, and then analyzing each model or sub-model individually. The ability to extract fragments from an assembly can increase application maintainability.

Although present devices are functional, they are not sufficiently modular or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for modeling industrial processes. In one exemplary embodiment, the present invention can include collecting a plurality of flowsheets, which include corresponding groups of unit models, and combining the plurality of flowsheets to create a combined model. In addition, when a first macro associated with a first flowsheet is initiated, other macros by the same name as the first macro are automatically executed. In variations, the other macros are executed from a lowest hierarchical level flowsheet, relative to the first flowsheet, to a higher hierarchical level until the first macro is run.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
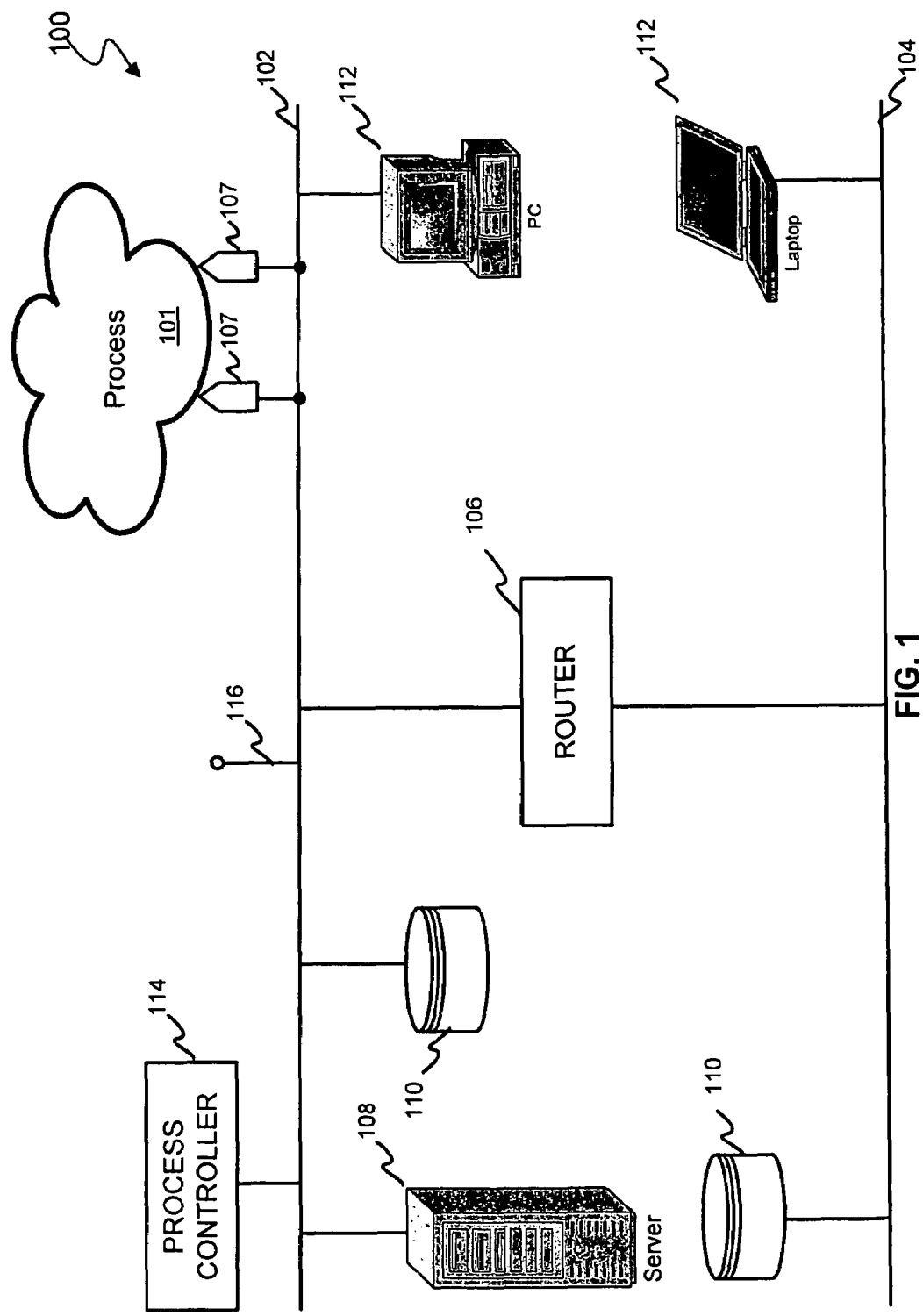
FIG. 1 illustratively represents an architecture of a system within which one embodiment of the present invention may be incorporated.

FIG. 1 illustratively represents the network architecture of a system 100 within which one embodiment of the present invention may be incorporated. The system 100 operates on a process 101, which may comprise any process including, without limitation, chemical processes, energy processes and distribution processes.

A process is normally made up of more than one unit of equipment, where each unit carries out some specific processing function, such as reaction, distillation, or heat exchange. Equipment units are interconnected and/or in fluid communication via streams. A plurality of plant sensors 107 are selected and configured to measure values of the regulatory variables applicable to the equipment units used to perform the process 101. These regulatory variables (e.g., pressure, temperature, level, and flow) are controlled to maintain process equipment operating at a designated state. These variables may also be adjusted by the operator to move the process equipment to other states (e.g., to increase production or efficiency).

As is described below, in accordance with one aspect of the present invention, subflowsheet models, which represent both equipment and non-equipment artifacts within the process 101, may be merged to form a larger more comprehensive flowsheet, while maintaining the identity of each subflowsheet. Advantageously, the ability to merge subflowsheets allows separate users, or separate groups of users, to each create their own subflowsheets (e.g., directed to corresponding subsystems in the process 101) and to merge them into a larger flowsheet, which enables modeling of the interaction between subsystems, while allowing the subflowsheets to be subsequently extracted for enhancements or diagnostic purposes.

An exemplary embodiment of the present invention facilitates the merging of subflowsheets by enabling conflicts (e.g., naming, electronic data interface (EDI) and data consistency conflicts) that may exist between independently created subflowsheets to be easily resolved. The present invention in some embodiments also includes mechanisms that enable scripting within subflowsheets to be initiated once merged into a larger flowsheet.

The system 100 may include a local area network (LAN) 102 that is connectable to other networks 104, including other LANs or portions of the Internet or an intranet, through a router 106 or similar mechanism. One example of such a LAN 102 may be a process control network to which process control devices, such as process controller 114, and plant sensors 107 are connected. Process control networks are well known in the art and are used to automate industrial tasks. The network 104 may be a corporate computing network, including possible access to the Internet, to which other computers and computing devices physically removed from the process 101 are connected. In one embodiment, the LANs 102, 104 conform to Transmission Control Protocol/Internet Protocol (TCP/IP) and Common Object Request Broker Architecture (COBRA) industry standards. In alternative embodiments, the LANs 102, 104 may conform to other network standards, including, but not limited to, the International Standards Organization's Open Systems Interconnection, IBM's SNA®, Novell's Netware®, and Banyon VINES®.

The system 100 includes a server 108 that is connected by network signal lines to one or more clients 112. In an exemplary embodiment the server 108 includes a UNIX or Windows NT-based operating system. The server 108 and clients 112 may be uniprocessor or multiprocessor machines, and may otherwise be configured in a wide variety of ways to operate consistent with the teachings of the present invention. The server 108 and clients 112 each include an addressable storage medium such as random access memory and may further include a nonvolatile storage medium such as a magnetic or an optical disk.

The system 100 also includes a storage medium 110 that is connected to the process control network 102 or corporate control network 104. In the exemplary embodiment the storage medium 110 may be configured as a database from which data can be both stored and retrieved. The storage medium 110 is accessible by devices, such as servers, clients, process controllers, and the like, connected to the process control network 102 or the corporate control network 104.

Suitable servers 108 and clients 112 include, without limitation, personal computers, laptops, and workstations. The signal lines may include twisted pair, coaxial, telephone lines, optical fiber cables, modulated AC power lines, satellites, and other data transmission media known to those of skill in the art. A given computer may function both as a server 108 and as a client 112. Alternatively, the server 108 may be connected to the other network 104 different from the LAN 102. Although particular computer systems and network components are shown, those of skill in the art will appreciate that the present invention also works with a variety of other networks and components.

Also shown in FIG. 1 is an electronic data interface (EDI) 1116, which enables the system 100 to interface with other databases. In the exemplary embodiment, the EDI describes how data should flow into the system 100. As an example, users of the system 100 may have a database for pricing of crude oil in a database sold under the trade name of Oracle that is accessible via the EDI. In this embodiment, the EDI acts as a connection point to electronic data stores and does not itself process data from the data stores. In some implementations, the EDI may also be utilized to couple the system 100 to the process controller 114 and the sensors 107 and to organize the received data into the proper variables and parameters.

The EDI 116 in one embodiment identifies data in terms of a datasource, a datatype, connecting port (point value), and grouping of ports. There may be multiple datasources for a database that is accessed by the system 100, and the datasource may include a name, type (e.g., SQL, Oracle, IBM, Pi, PhD, etc.), table name, user and a password (e.g., a password to access the databases). In general, the datasource defines how the system 100 should connect to these databases.

The datatype defines how data is interpreted when received by the system 100, and this interpretation may be configurable by users of the system 100. As an example, a logical value of one (e.g., from the process controller 114) may be interpreted by the system 100 as a logical value of zero.

The connecting port defines a connection between specific a data point of the system 100 and a data point in the database(s) accessed by the system 100. As an example, a data item denominated as "Crude Price" within the system may be connected to an Oracle database named "Corporate Data" in table 3 row 4. The port grouping enables users to group the connecting ports into a logical group and access them as a collection.

Figure 2:
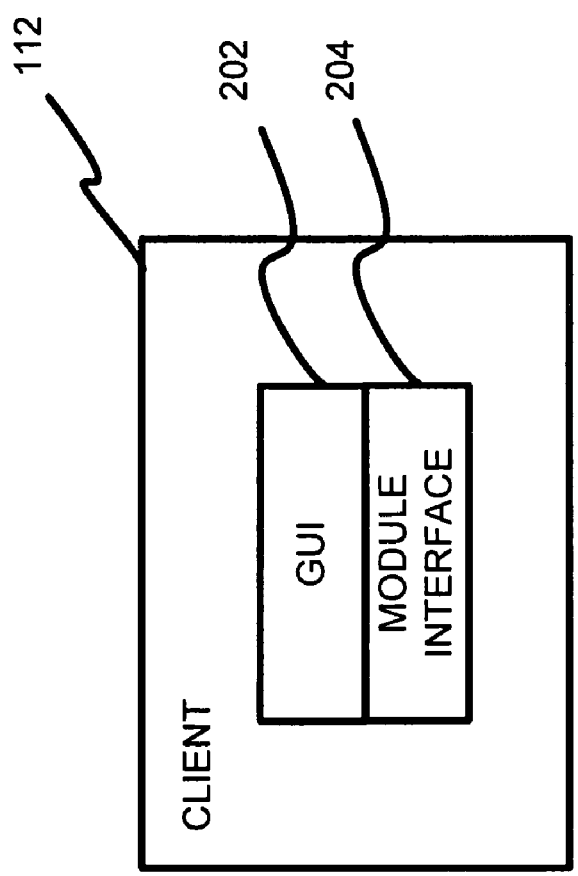
FIG. 2 illustrates an architecture of a client unit which may be used with an exemplary embodiment of the present invention.

FIG. 2 illustrates an architecture of the client 112 which may be used with one preferred embodiment of the present invention. The client 112 provides access to the functionality provided by the server 108. The client 112 includes a GUI 202 and an optional module interface 204. The Graphical User Interface (GUI) 202 is used to build, specify and merge model applications. One embodiment of the GUI 202 incorporates user interface features such as tree views, drag-and-drop functionality, and tabbed windows to enhance the intuitiveness and usability of the interface. The GUI 202 further enables access to other encapsulated GUIs such as process unit GUIs, non-process unit GUIs, and stream GUIs as described below.

Access to the GUI 202, as well as other architectural objects to be discussed in detail below, are through the optional module interface 204. In one embodiment, the module interface 204 is the Interface Definition Language (IDL) as specified in the CORBA/IIOP 2.2 specification. In one embodiment, the module interface 204 provides a uniform interface to the architectural objects, such as the GUI 202. The module interface 204 allows the actual implementation of the architectural objects, such as the GUI 202, to be independent of the surrounding architecture, such as the operating system and network technology. One of ordinary skill in the art will recognize that the module interface 204 may conform to other standards, or even be non-existent.

Figure 3:
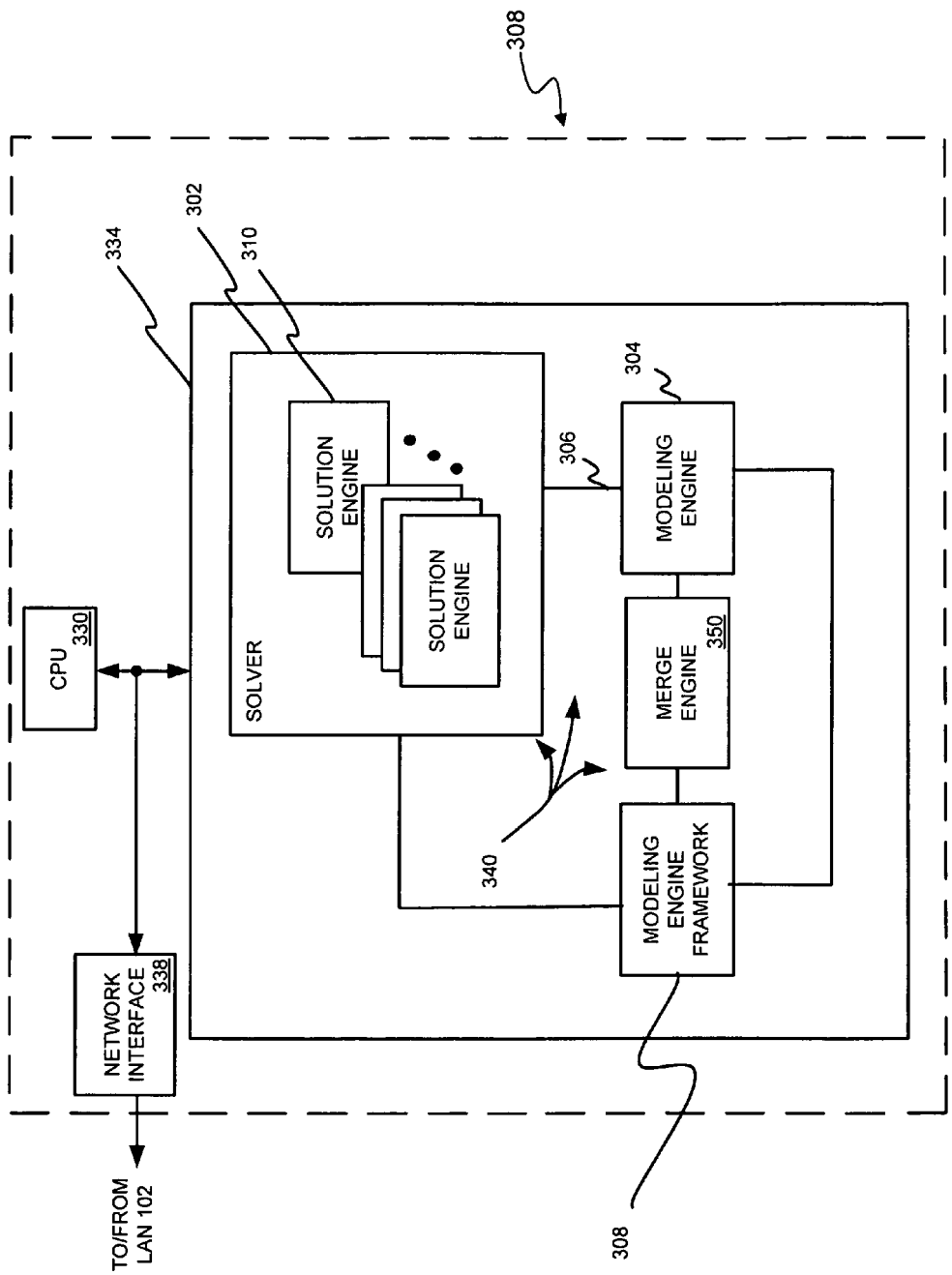
FIG. 3 is a block diagram representative of the internal architecture of a server unit operative in accordance with the present invention.

FIG. 3 is a block diagram representative of one embodiment of the internal architecture of the server 108, which may be physically implemented using a standard configuration of hardware elements. As shown, the server 308 in this embodiment includes a CPU 330, a memory 334, and a network interface 338 operatively connected to the LAN 102. The memory 334 stores a standard communication program (not shown) to realize standard network communications via the LAN 102. The memory 334 further stores a solver 302 accessible by a modeling engine 304 through an access mechanism 306, a modeling engine framework 308 and a merge engine. The solver, modeling engine 304, and modeling engine framework 308 collectively comprise a simulation module 340.

The modeling engine 304 provides an environment for building and solving process models. The solver 302 provides a solution algorithm for solving a process model generated by the underlying modeling engine 304. In one embodiment, the solver 302 may contain one or more solution engines 310 which are used in solving different process models. For example, one solver that may be used is Opera, a solver available from the Simulation Sciences unit of Invensys Systems, Inc. as part of the ROMeo System. In one embodiment, the solver 302 comprises a solution engine 310 implemented as a generalized matrix solver utilizing a Harwell subroutines. As is well known in the art, the Harwell library is an application independent library of mathematical subroutines used in solving complex mathematical equation sets. In one embodiment, the access mechanism 306 is specific to the solution engine 310 contained in the solver 302 and the modeling engine 304 used in generating the math model.

The merge engine 350 in the exemplary embodiment enables subflowsheet models to be merged (e.g., one flowsheet may be imported into another flowsheet) to form a larger more comprehensive flowsheet. Beneficially, the merge engine 350 enables separate users, or separate groups of users, to each create their own subflowsheets (e.g., directed to corresponding subsystems in the process 101) and to merge them into a larger flowsheet, which enables the interaction between subsystems to be modeled. In many implementations, the merge engine 350 also enables the subflowsheets to be subsequently extracted from the larger combined flowsheet so that, for example, enhancements or diagnostics may be performed on the subflowsheets. In addition, the merge engine 350 may resolve conflicts (e.g., naming, electronic data interface (EDI) and data consistency conflicts) between subflowsheets and may enable scripting within subflowsheets to be initiated once merged into a larger flowsheet.

The modeling engine framework 308 is an interpretive layer providing user-friendly access to the modeling engine 304 and the merge engine 350. In one embodiment, the modeling engine framework 308, working in conjunction with the GUI 202, provides a user with the interface to add new unit models, modify existing unit models, merge flowsheets and generally interact with the modeling engine 304 and merge engine 350 without having to know the specifics of either the modeling engine 304 or the merge engine.

Figure 4:
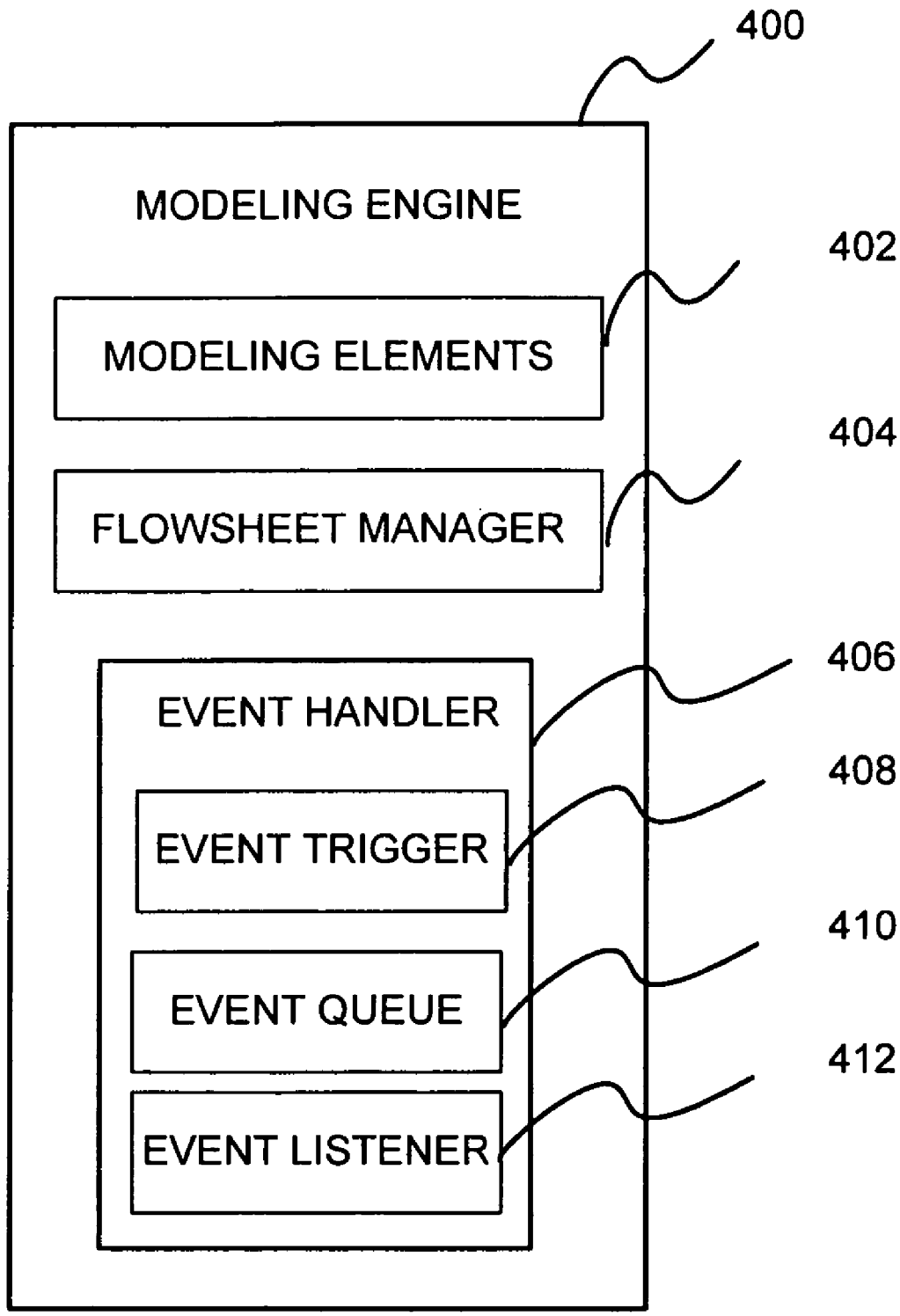
FIG. 4 further illustrates certain additional components comprising a modeling engine of a simulation module.

FIG. 4 further illustrates certain additional components comprising the modeling engine 400 in one preferred embodiment. The modeling engine 304 comprises model elements 402, a flowsheet manager 404, and an event handler 406. The model elements 402 include individual units and streams from which a user builds a flowsheet model. For example, a pump is a unit that the user may include in a flowsheet model.

A unit represents a device that may be found in a process plant. The unit may be a process or an on-process unit. A process unit is an item of operating hardware such as a heat exchanger, a compressor, an expander, a firebox, a pipe, a splitter, a pump, and the like. As mentioned above, each unit is represented by a generally nonlinear model characterized by one or more parameters. Each parameter of a given model will typically pertain to mass or energy transfer characteristics of the equipment unit represented by the model. Some or all of these parameters may be considered maintenance parameters, and will generally be considered as such to the extent that monitoring the changes in their respective values over time may enable an inference of the condition of the applicable unit of equipment.

A non-process unit is something other than an item of operating hardware. For example, a non-process unit may be a penalty. A penalty unit assigns a progressively increasing weight to a measured output temperature value beyond the optimum output temperature. For example, the penalty unit may account for the increased cleanup costs associated with operating the furnace at a higher than optimum output temperature. Another example of a non-process unit may be a measurement from measuring devices such as flow meters, thermocouples, and pressure gauges.

In one embodiment, each unit typically has one or more entry or exit ports and is associated with a model. The model is a collection of variables and equations, collectively known as a calculation block. A unit model represents the operation of the unit in terms of its associated calculation block. As an example, an equation for a measurement unit may be:

$$\text{ModelVariable} - \text{Scan} - \text{Offset} = 0$$

where ModelVariable is a calculated value, Scan is a measured value, and Offset is the difference between ModelVariable and Scan. The above equation contains three variables: ModelVariable, Scan and Offset.

As another example, the equations for a pump unit may be:

$$\text{PresRise} - \text{Product:Pres} + \text{Feed:Pres} = 0, \text{ and}$$
$$\text{Head} * \text{GravConst} *$$

$$\text{Feed:Prop[``WtDens'']} - 1000 * \text{PresRise} = 0$$

where PresRise is a rise in pressure, Product:Pres is an output pressure, Feed:Pres is an input pressure, Head is a liquid height within a tank connected to the pump, GravConst is the gravity constant, Feed:Prop["WtDens"] is a weight density of the liquid in the tank, and the PresRise is a rise in pressure of the pump. In the first equation, PresRise, Prod:Pres, and Feed:Pres are variables. In the second equation, Head, Feed:Prop ["WtDens"], and PresRise are variables. GravConst is a parameter, and thus requires a value to be assigned before the equation may be solved.

A stream is used to connect a unit's entry or exit port to another unit's exit or entry port respectively. Furthermore, a feed stream is connected to the unit's entry port, whereas a product stream is connected to the unit's exit port. A stream model may have associated equations and variables. For example, a simplified stream model may be represented as follows:

$$y = ax + b$$

where "y" is a measurement that is allowed to assume values within a predefined range, and "x", "a" and "b" are parameters representative of equipment condition (i.e., "a" and "b" will generally change over time due to equipment wear), and "x" is a calculated value.

In one exemplary embodiment, multi-dimensional data structures are used to store individual units and streams, and their associated variables and equations. The data structures may also store other information such as, but not limited to, the type of unit or stream, whether a variable requires a user-provided value, the variable's lower bound, upper bound, solution value, or status. One of ordinary skill in the art will recognize that the data structures may be in the form of an array, linked list, or as elements within other data structures.

The flowsheet manager 404 provides access to instances of unit models, stream models, and other information associated with a flowsheet model. In one embodiment, the information associated with a flowsheet model may be stored in the storage medium 110. In many embodiments, the storage medium 110 stores at least one flowsheet model, including an equation, of an actual plant process. The flowsheet manager 404 may then communicate with the storage medium 110 to provide a user access to the information contained in the storage medium 110 in a manageable format. Further details regarding creation, modification and alteration of flowsheet models are provided in, for example, U.S. Pat. No. 6,442,512, filed Nov. 17, 1998 and entitled INTERACTIVE PROCESS MODELING SYSTEM; U.S. Pat. No. 6,442,515, which is entitled PROCESS MODEL GENERATION INDEPENDENT OF APPLICATION MODE; and U.S. Pat. No. 6,323,882, which is entitled METHOD AND SYSTEMS FOR A GRAPHICAL REAL TIME FLOW TASK SCHEDULER, each of which is hereby incorporated by reference in its entirety.

In the exemplary embodiment depicted in FIG. 4, the event handler 406 maintains the consistency of the flowsheet model. In one preferred embodiment, the event handler 406 includes an event trigger 408, an event queue 410, and an event listener 412. The event trigger 408 is called in response to a change to the flowsheet model, and queues up the change in the event queue 410. In one embodiment, the event queue 410 may be implemented as part of a database. The event listener 412 monitors the event queue 410 and in response to the contents contained in the event queue 410, appropriately alters the flowsheet model. For example, if a user removes an element, such as a unit, from the flowsheet model, all references in the flowsheet model to that element are removed, thus maintaining the consistency of the flowsheet model.

Figure 5:
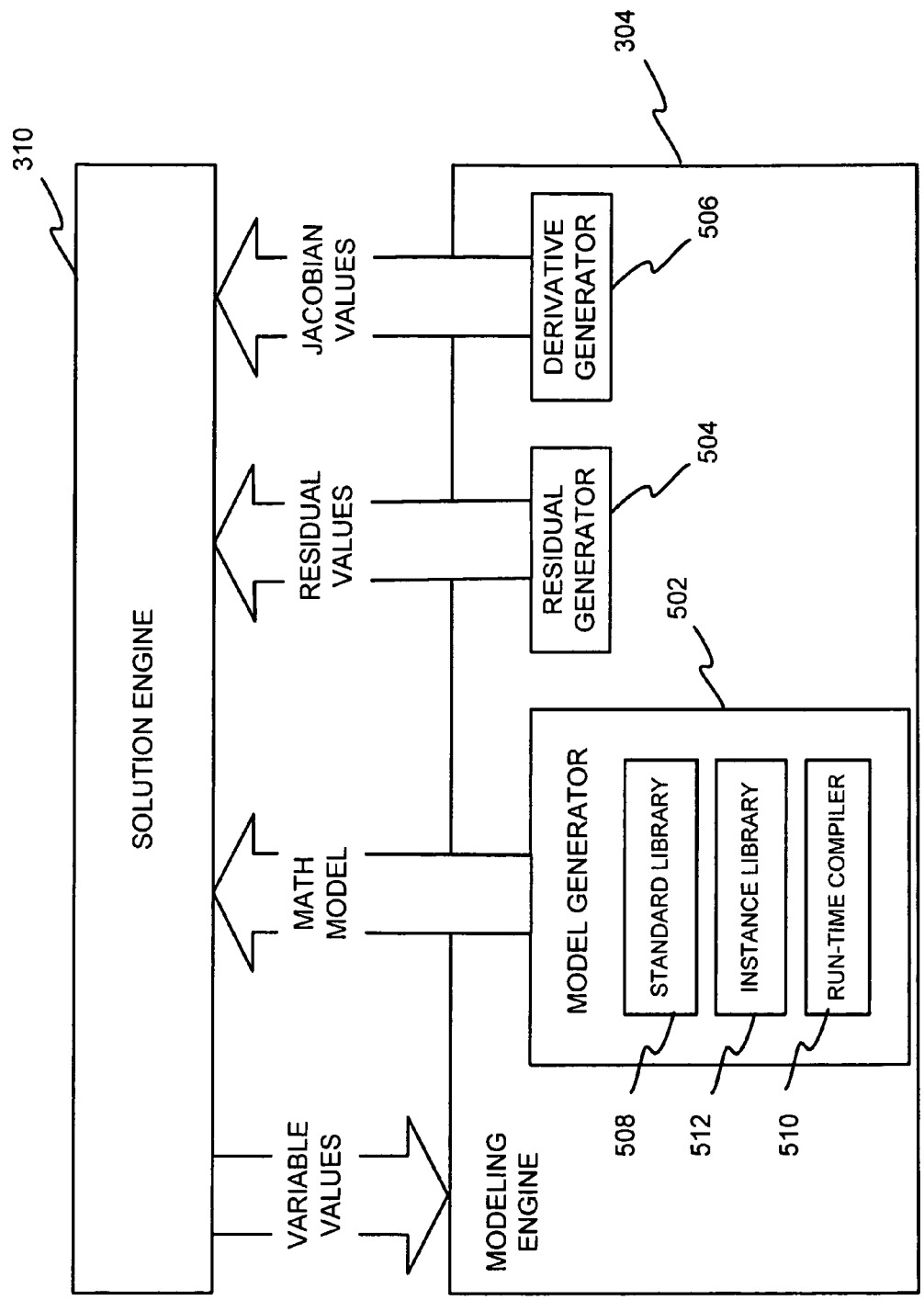
FIG. 5 further illustrates one embodiment of the interaction between the modeling engine and a solution engine of the simulation module.

FIG. 5 further illustrates one embodiment of the interaction between the modeling engine 304 and the solution engine 310 of the simulation module 340. As is described in the above-identified patent documents, the modeling engine 304 in this embodiment additionally comprises a model generator 502, a residual generator 504, and a derivative generator 506. The modeling engine 304 provides the open form of model equations to the solution engine 310. The solution engine 310, in turn, solves the equations. In an alternative embodiment, a closed form of the model equations may be provided by the modeling engine 304.

In one embodiment, the model generator 502 creates a math model of the flowsheet for input to the solution engine 310. The math model is a large set of equations and variables which models the plant process. In one embodiment, the math model is in the form of a matrix which represents the equations contained in the flowsheet model in the form f(x)=0. The math model may also contain other information, such as parameter values and the like, used in solving or converging the math model. Standard equations and variables associated with a corresponding unit model or stream model are provided in a previously compiled standard library 508. If the user customizes any unit model, for example, through a customization module 608 discussed further below, a run-time compiler 510 compiles the customized unit models to generate an instance library 512. The math model is created by the model generator 502 using the standard library 508 and the instance library 512, if one exists.

One embodiment of the run-time compiler 510 operates as follows. The run-time compiler 510 checks each unit and stream model contained in the flowsheet, identifies and compiles the customized models, and generates the instance library 512. A status indicator may identify the customization status of each unit or stream model contained in the flowsheet. The status indicator may be implemented as part of each unit and stream model's multi-dimensional data structure. In an alternative embodiment, rather than checking each unit and stream contained in the flowsheet, a list of the customized unit and stream models may be maintained. The run-time compiler 510 then compiles the customized unit and stream models using the list, and thus does not have to check every unit or stream model. In another embodiment, the run-time compiler 510 may compile each unit or stream model as it is customized.

In one embodiment, the residual generator 504 uses the variable values generated by the solution engine 310 to calculate residual values for the equations in the math model. A residual value is the value of the equation f(x) when calculated. When the residual is zero, the equation f(x) is solved. The derivative generator 506 calculates Jacobian, or derivative values for each of the equations contained in the flowsheet model. The solution engine 310 uses the residual values and the Jacobian values generated respectively by the residual generator 504 and the derivative generator 506 to calculate the variable values. The process of generating the variable values, residual values, and Jacobian values may need to be repeated numerous times before the math model is solved or converges.

Figure 6:
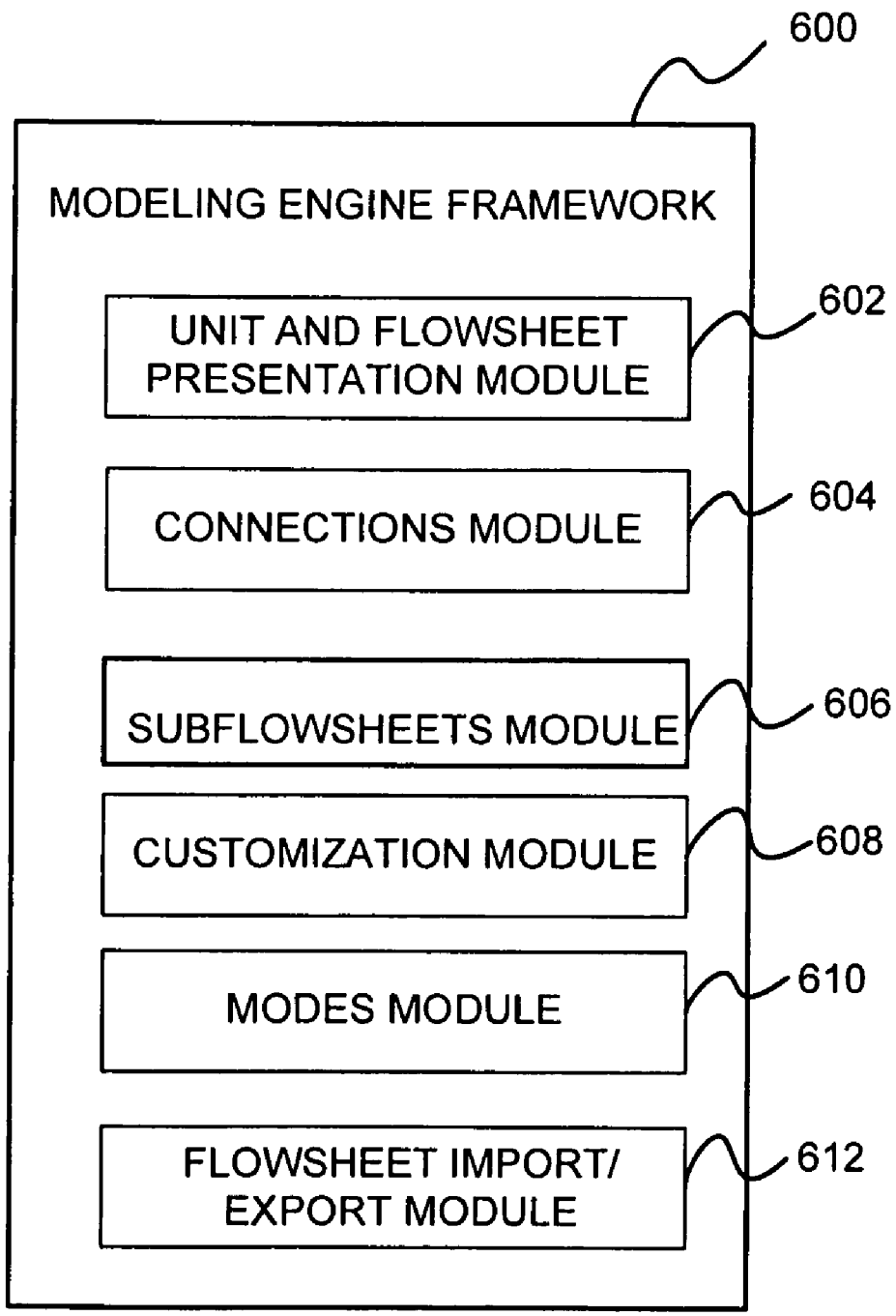
FIG. 6 is a high level block diagram illustrating the architecture of a modeling engine framework.

FIG. 6 further illustrates one embodiment of the modeling engine framework 308 depicted in FIG. 3. The modeling engine framework 600 comprises a unit and flowsheet presentation module 602, a connections module 604, a subflowsheets module 606, the customization module 608, a modes module 610, and a flowsheet import/export module 612. The modeling engine framework 308 interacts with both the GUI 202, the modeling engine 304 and merge engine 350 through corresponding module interfaces, to present to the user an intuitive environment for creating and modifying unit and flowsheet models.

In one variation, the unit and flowsheet presenter 602 works in conjunction with the GUI 202 to facilitate the intuitive presentation of the information and features contained in the modeling engine 304. In the exemplary embodiment, the unit and flowsheet presentation module 602 may organize the modeling engine 304 functions and features into readily identifiable groups. For example, icons representing the process units may advantageously be grouped together and presented in the GUI 202 window.

The connections module 604 in this embodiment provides an environment for the user to correctly utilize streams. The streams are used to connect units. For example, a stream may connect two units with compatible ports. Streams may be classified into various types depending on the type of units they connect. In one embodiment, a process stream may connect two process units, whereas a non-process stream may connect two non-process units or may connect a process unit to a non-process unit.

In another embodiment, the connections module 604 may provide a stream's status to a user. For example, a stream not connected at either end may be indicated by a specific shading or color, such as red, thus informing the user of an error condition. In one embodiment, the positioning of the stream's endpoints on the GUI 202 may be used to determine if a connection has been made to a unit's port. If a connection has been made, a logical link may be established between a variable in the stream's model and a variable in the unit's model. In yet another embodiment, non-process streams connecting undefined or non-existent variables may be indicated by a corresponding shading or color indicating the error condition. Regardless of the error condition, the user may advantageously continue modifying the flowsheet.

In one embodiment, the subflowsheets module 606 advantageously allows users to graphically group one or more units into a collection in order to assemble a flowsheet as described with more detail in U.S. Pat. No. 6,442,515, as mentioned above.

In one preferred embodiment, the customization module 608 permits the user to customize the unit models. Typically, conventional plant process modeling systems consist of a predefined equation or set of equations generally representing the operation of a plant device or unit. The predefined equations may be adequate for modeling a generic plant process, a generic process element, and a standard plant operating condition. In contrast, the customization module 608 allows for the modification to, or extension of, the predefined equations to better represent the operation of an actual device under specific plant conditions. Thus, the user is able to enhance the modeling of a plant process. For example, a unit model may be customized to more accurately reflect the operation of the specific plant device or unit by including variables and equations representing empirical plant data. Furthermore, a user can include proprietary modeling information in addition to, or in place of, standard equations.

In the exemplary embodiment, the flowsheet import/export module 612 works in conjunction with the GUI 202 to facilitate the intuitive presentation of the features contained in the merge engine 350. The flowsheet import/export module 612 may organize the merge engine 350 functions and features into readily identifiable groups. For example, options allowing flowsheets to be imported and exported may advantageously graphically presented in the GUI 202 window.

Figure 7:
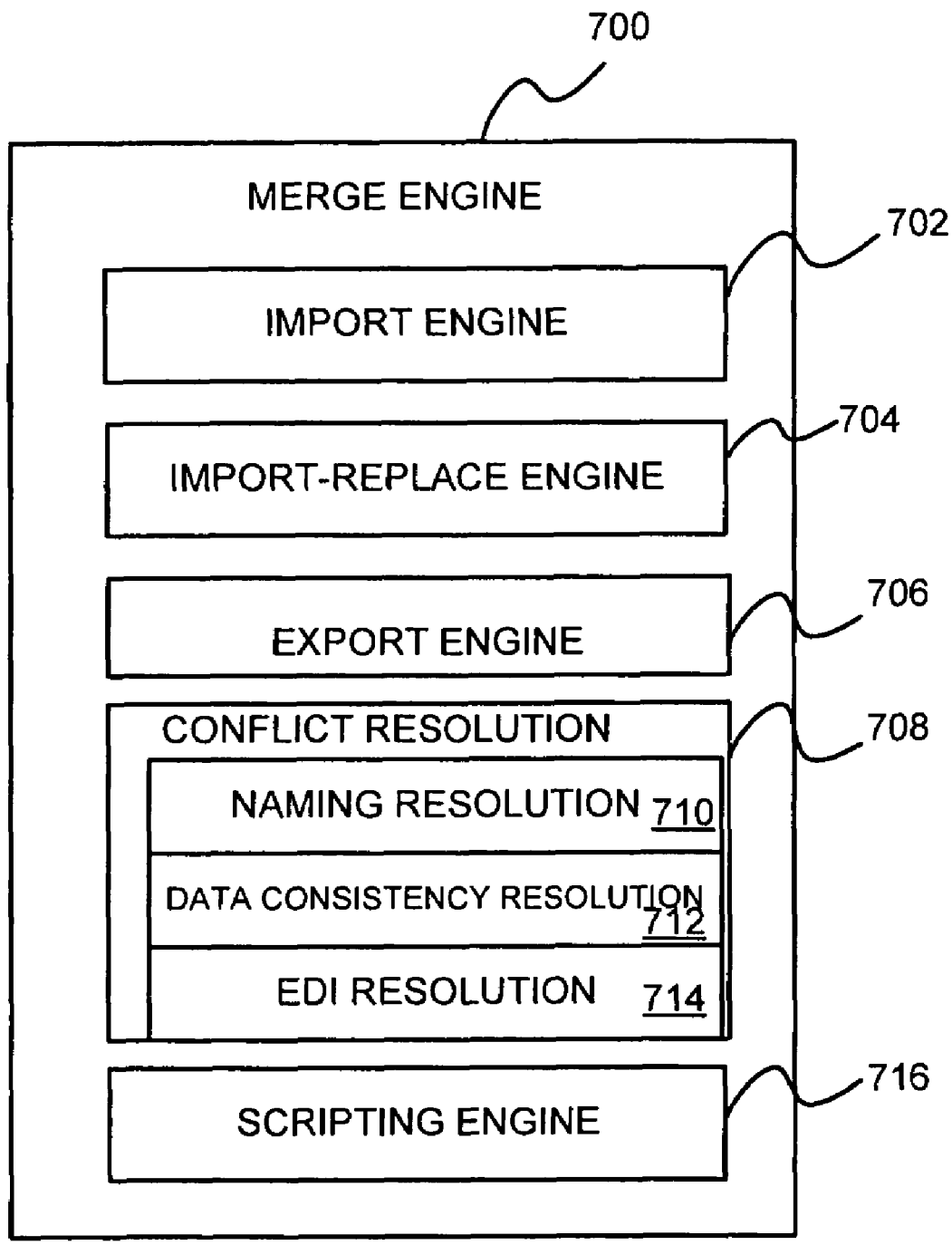
FIG. 7 is a block diagram of an embodiment of a merge engine.

Referring next to FIG. 7, shown is one embodiment of the merge engine 350 described with reference to FIG. 3. As shown, the merge engine 700 in this embodiment includes an import engine 702, an import/replace engine 704, an export engine 706, a conflict resolution engine 708, which includes naming resolution, data consistency resolution and EDI resolution modules 710, 712, 714. As shown, the merge engine 700 in this embodiment also includes a scripting engine 716.

The import engine 702 in the exemplary embodiment enables a first flowsheet to be imported into second flowsheet so as to merge the two flowsheets together into a third, combined flowsheet. In accordance with many embodiments, the third flowsheet may also be imported into yet another flowsheet so as to create a fourth flowsheet, which includes the first, second and third flowsheets, which are also referred to herein as subflowsheets.

The import-replace engine 704 in this embodiment 704 is configured to import a flowsheet into a root flowsheet so as to replace an existing subflowsheet that resides within the root flowsheet. In this way, replacing a subflowsheet with another flowsheet is rendered a simple process.

The export engine 706 in this embodiment is adapted to enable a user to selectively export subflowsheets from a flowsheet. And once a flowsheet is exported, users may, for example, reuse the exported flowsheet in another flowsheet or may modify the exported flowsheet and utilize the import-replace engine 704 to replace the original subflowsheet with the modified subflowsheet.

The conflict resolution engine 708 generally identifies and assists the resolution of conflicts that may exist between flowsheets so that the flowsheets may be merged together and operate properly. The naming resolution engine 710 may be configured to suggest modified names for imported objects to resolve name conflicts between the imported objects and those existing in the flowsheet which is importing the objects. The user can then either change the current flowsheet to fix the problem, accept the suggested names for conflicting objects or provide new names to avoid conflicts.

The data consistency resolution module 712 in the exemplary embodiment is configured to identify conflicts that may exist between data items of two flowsheets. As an example, if there are conflicts between energy pricing data, oil blend information or the thermal energy calculation methodologies utilized by the flowsheets, the data consistency resolution module 712 identifies that conflicts and informs the user(s) of the conflicts to enable the conflicts to be resolved before the flowsheets are merged.

The EDI resolution module 714 in this embodiment is configured to identify conflicts that may include conflicts in the datasource definitions, datatypes and data port groupings utilized by the flowsheets. With respect to datasources, if two flowsheets have different datasource definitions, when one flowsheet is imported into the other, the two datasources are added to the system 100 database (e.g., database 110). If, however, there is a conflict between databases that are utilized by the flowsheets (e.g., both databases include a Datasource1, but each database connects to a different datasource), the conflict will be displayed so that the user(s) may resolve the conflict.

In addition, the EDI resolution module 714 in the exemplary embodiment is configured to identify datatype conflicts between two flowsheets, which may interpret data from an outside database differently. In response, the EDI resolution module 714, will display any conflicts to inform the user(s) so that the conflicts may be resolved.

The EDI resolution module 714 in this embodiment is also configured to identify conflicts that may exist in the naming of port groupings. In response to any conflicts, the EDI resolution module 714 will identify the conflicts so that the user(s) may rename any conflicting port groupings.

When one or more flowsheets are successfully imported into one or more other flowsheets, in response to an initiation of a macro in any one of the flowsheets, the scripting engine 716 in this embodiment is configured to execute other macros. As discussed further herein, macros are used to help automate the setup of variables and parameters as well as to verify certain elements of the flowsheet's configuration prior to its use for a particular application mode. Macros are small, program-like scripts that in some examples of the system may be either globally or locally associated with particular flowsheets.

In accordance with one embodiment of the invention, when a user requests that a macro be executed at one level of a hierarchy of macros, the scripting engine 716 automatically executes macros associated with any nested subflowsheets. This cascading execution of macros can be used to allow design decisions in each subflowsheet to be accommodated without the higher-level flowsheets being dependent on or aware of the particular operations of the lower-level flowsheets.

For example, by prior agreement across development teams, flowsheets may include identically named macros, which are executed from the lowest level of the subflowsheet nesting hierarchy to the top, finally executing a root flowsheet.

In addition, the system 100 may also automatically execute macros that are identified by a predetermined name. In one exemplary implementation, two macros are automatically executed: a PreInstance macro and a PostInstance macro. These macros execute like other macros except that they are automatically called after a user "runs" a model. If the flowsheets/subflowsheets do not include these macros, macros will be created, for each of the flowsheet/subflowsheets, that do not provide any function. Users may modify the content of these macros to customize them, for example, to make sure that the status of equipment is the same as in the plant, or to make sure that there is no "empty" equipment (no flow). When a user runs the model, these automatically-executed macros are run in a manner that is similar to the execution of other macros (e.g., starting from a lower level subflowsheet and moving up in the flowsheet hierarchy).

Figure 8:
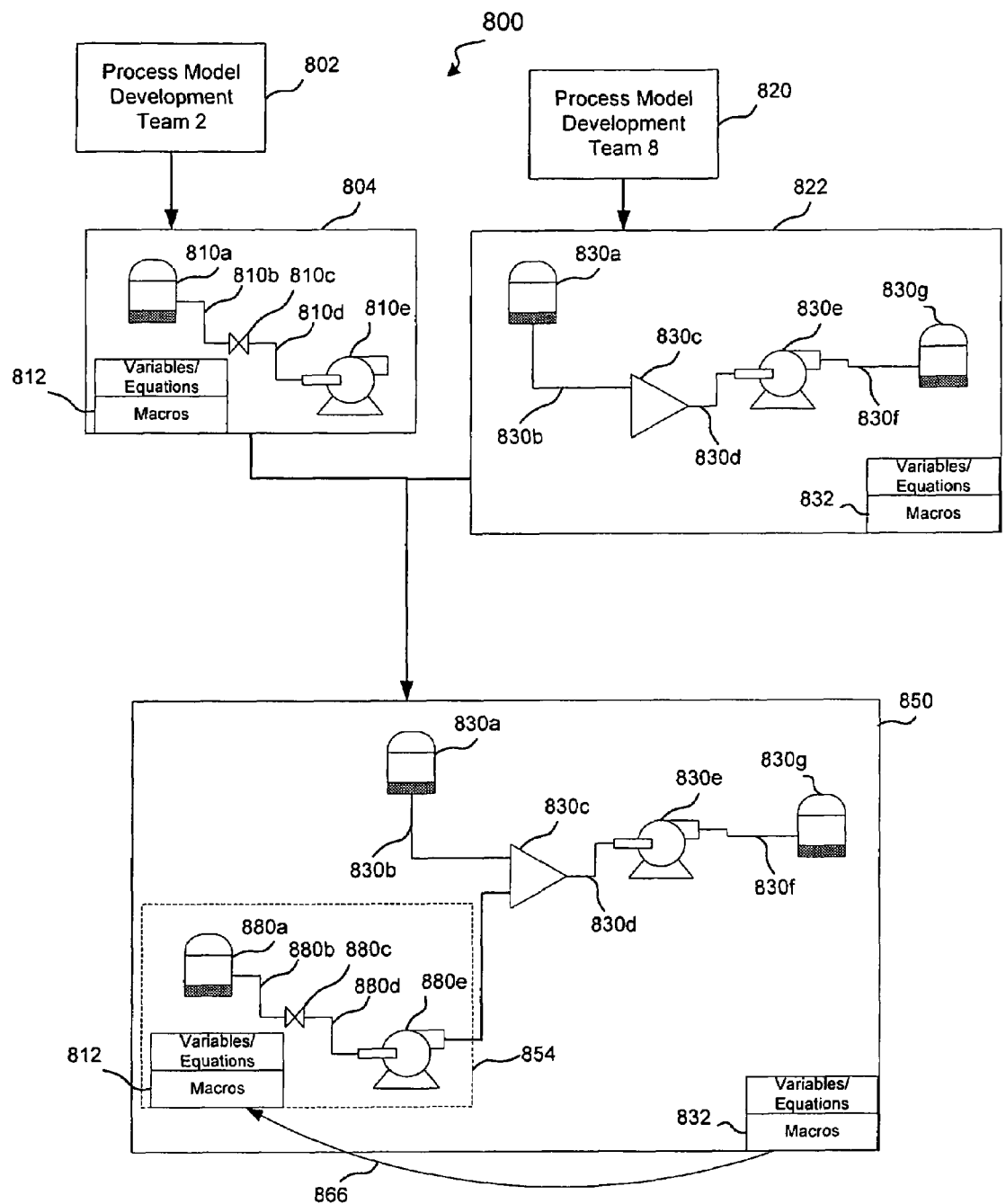
FIG. 8 is a flow diagram depicting an exemplary merging of flowsheets in accordance with one embodiment.

Referring next to FIG. 8, shown is an example of two development teams 802 and 820 merging respective flowsheets 804, 820 into a combined flowsheet 850. The flowsheet 822 created by the first development team 820 may comprise, for example, a storage tank 830a connected by a stream 830b to a mixer 830c which is in turn connected by another stream 830d to a pump 830e, which is connected by yet another stream 830f to a storage tank 830g. The subflowsheet 804 created by the second development team 802 may comprise, for example, a storage tank 810a connected by a stream 810b to a valve 810c, which is in turn connected by another stream 810d to a pump 810e.

In this example, each flowsheet 804 and 822, contains units such as the storage tanks 810a, 830a, 830g, and pumps 810e, 830e. In the exemplary embodiment, each unit is associated with model-variables, parameters, and equations, collectively known as a calculation block. The calculation block is a mathematical representation of the unit's operations and characteristics. A flowsheet may contain unit models and may also comprise variable values, operating specifications and macros.

The units, variables, parameters, equations and macros may each be given names to identify them. These names, and thus the underlying objects, may be considered either local or global. Local objects (also referred to as flowsheet macros) are associated with a particular flowsheet and may have names that are identical to other objects that are associated with other flowsheets.

In an embodiment of the system, the system may call flowsheet macros from parent flowsheets, but in this embodiment they still execute under the context of the owning flowsheet, not the calling flowsheet. Local objects use the context of their associated flowsheet to uniquely identify them. Global objects have names that are unique across an entire process model's flowsheets, and are not specific to a certain set of units and streams.

In one example of the system, the macros are stored in macro managers. In this example, there is one global macro manager for the entire system, and there is one flowsheet-specific macro manager for each flowsheet. Though macros may be created by users of the system, the system may also automatically create macros such as Pre/Post instance macros which can store instructions on how to configure/de-configure the objects for certain application modes such as simulation or real-time-optimization.

In many embodiments, a user assigns values to parameters and other variables before using the flowsheet (e.g., to run simulations, optimization scenarios or for other application modes). Depending on the application mode, certain variables and parameters may need to be set to particular values, while others, particularly those which the model is being used to solve, may remain free.

In another embodiment of the system, macros are used to help automate the setup of variables and parameters as well as to verify certain elements of the flowsheet's configuration prior to its use for a particular application mode. In the exemplary embodiment depicted in FIG. 8, macros 812 and 832 are each local macro sets that are associated, respectively, with flowsheets 804 and 822.

As shown in FIG. 8, the flowsheet 804 is a modular portion of a larger process model 850 which is represented by the combination of flowsheet 804 with flowsheet 822. As shown, the flowsheet 804 in this embodiment, is augmented with an independently-developed process model 822 by using the import engine 702 to assemble a more complex flowsheet 850. As depicted, once a flowsheet (e.g., the flowsheet 804) is imported, it retains an identity as a subflowsheet (e.g., subflowsheet 854). Repeated use of this import process may result in a hierarchy of flowsheets, subflowsheets and sub-subflowsheets to any depth of nesting.

In accordance with several embodiments, an imported subflowsheet may retain its identity as a separate flowsheet despite being used as a building block in the creation of a larger root flowsheet (e.g., flowsheet 850). This identity may later be used to refer to the flowsheet. For example, the current version of a subflowsheet may be exported from the system when a user refers to it by its name. In addition to having a separate identity, a subflowsheet 854 may have its own macros 812 which have been designed to configure the associated subflowsheet's 854 variables and parameters.

In accordance with one embodiment of the invention, when a user of the model requests that a macro be executed at one level of the hierarchy, the scripting engine 716 automatically executes 866 the macros 812 associated with any nested subflowsheets. This cascading execution of macros can be used to allow design decisions in each subflowsheet to be accommodated without the higher-level flowsheets being dependent on or aware of the particular operations of the lower-level flowsheets.

For example, by prior agreement across development teams 802, 820, the macros 812 may include a macro named "Setup Simulation" which contains setup instructions specific to the architecture of the subflowsheet 854. The root flowsheet 850 would have an identically-named macro which was designed to appropriately setup flowsheet 850. In one embodiment of the system, the root flowsheet's "Setup Simulation" macro could be called in a cascade mode, which causes execution any identically-named macros from the lowest level of the subflowsheet nesting hierarchy to the top, finally executing root flowsheet 850 macro 832.

As previously discussed, each unit model typically has one or more entry or exit ports, and a stream is connected to the unit's entry or exit port. A feed stream is connected to a unit's entry port, whereas a product stream is connected to a unit's exit port. For instance, the control valve 810c has stream 810b connected to its entry port and stream 810d connected to its exit port. These streams 810b, 810d, mathematically connect the variables and equations associated with the unit models.

In accordance with many embodiments, when a subflowsheet is imported into a container flowsheet, the product streams from the subflowsheet's unit models may be connected as feed streams to entry ports of unit models in the container flowsheet and vice-versa.

Figure 9:
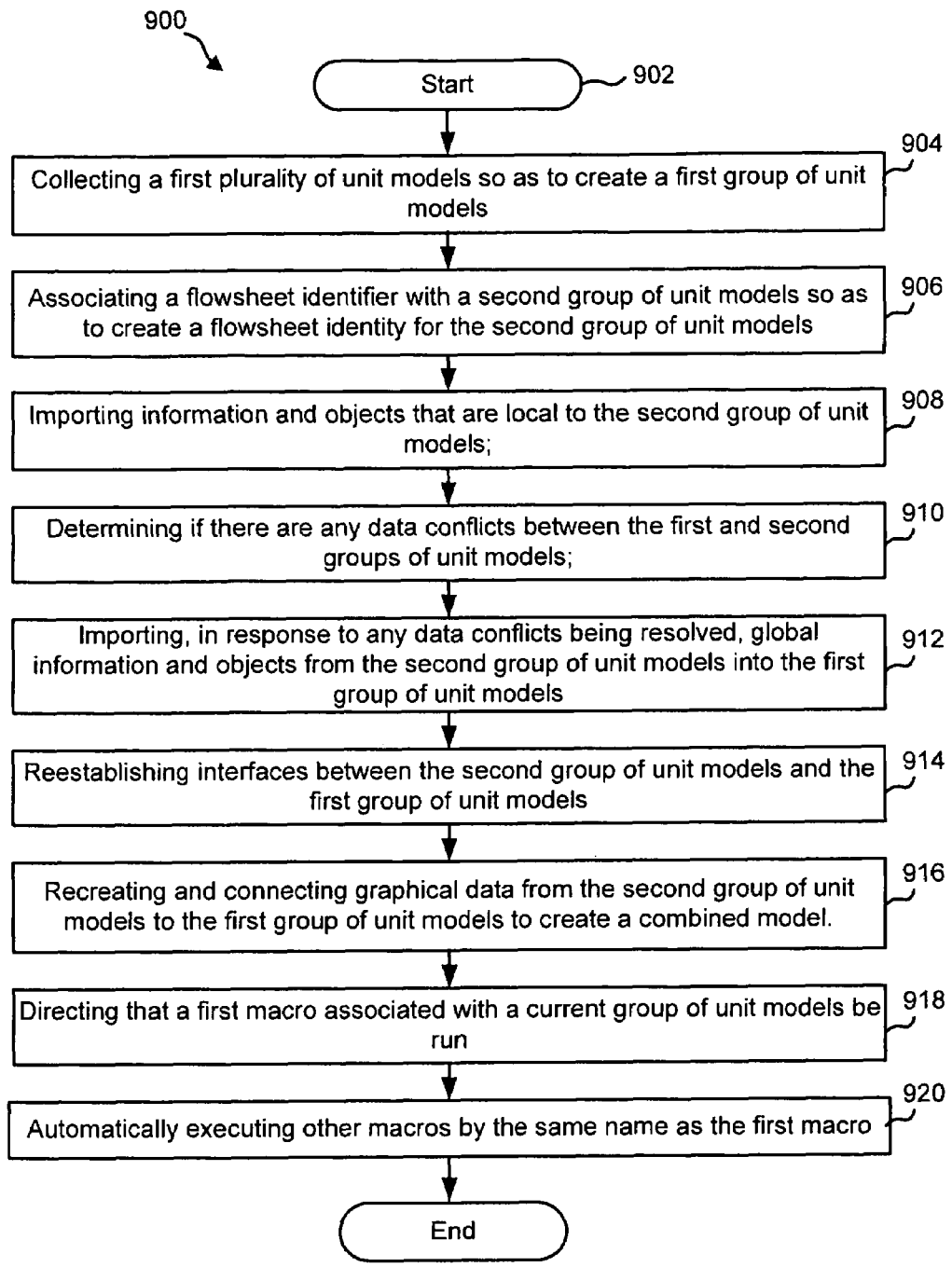
FIG. 9 is a flowchart depicting steps carried out in accordance with a method for process modeling.

Referring next to FIG. 9, shown is a flowchart 900 depicting steps carried out to import a subflow sheet in accordance with one embodiment. As shown, a first plurality of unit models (e.g., unit models 830a, 830c, 830g, 830e) are collected to create a grouping of unit models (e.g., the flowsheet 822)(Block 904). In addition, a flowsheet identifier is associated with a second group of unit models (e.g., the unit models 810a, 810c, 810e that make up the flowsheet 804)(Block 906), and information and objects that are local to the second group of unit models are imported (Block 908).

As shown in FIG. 9, a determination is made as to whether there are any conflicts between the first and second groups of unit models (Block 910), and if there are any conflicts (e.g., in naming, data consistency or between EDI references) the conflicts are resolved (e.g., by the conflict resolution engine 708) and global information and objects from the second group of unit models are imported into the first group of unit models (Block 912).

As depicted in FIG. 9, an interface between the imported unit models and the destination flowsheet is also established (Block 914), and graphical data from the second group of unit models is created and connected to the first group of unit models to create a combined model (e.g., flowsheet 850) (Block 916).

As shown in FIG. 9, in some embodiments, once the first group of unit models (e.g., unit models 830a, 830c, 830g, 830e) and second group of unit models (e.g., the unit models 810a, 810c, 810e) are combined to form a combined model (e.g., flowsheet 850) a first macro associated with one of the groups of unit models may be run (Block 918), and other macros by the same name as the first macro will then automatically be executed as well (Block 920). It should be recognized that the steps depicted in flowchart 900 may be followed in parallel or in a different order than depicted without departing from the scope of the present invention.

Advantageously, development may continue on a subflowsheet (e.g., the flowsheet 854) on a standalone basis even after it has been integrated within a larger model (e.g., flowsheet 850). It may be desirable, for example, to make and test improvements to a subflowsheet outside of the more complex integrated environment both to simplify the complexity of testing, and to isolate the integrated model from possible problems resulting from modifying the subflowsheet.

Figure 10:
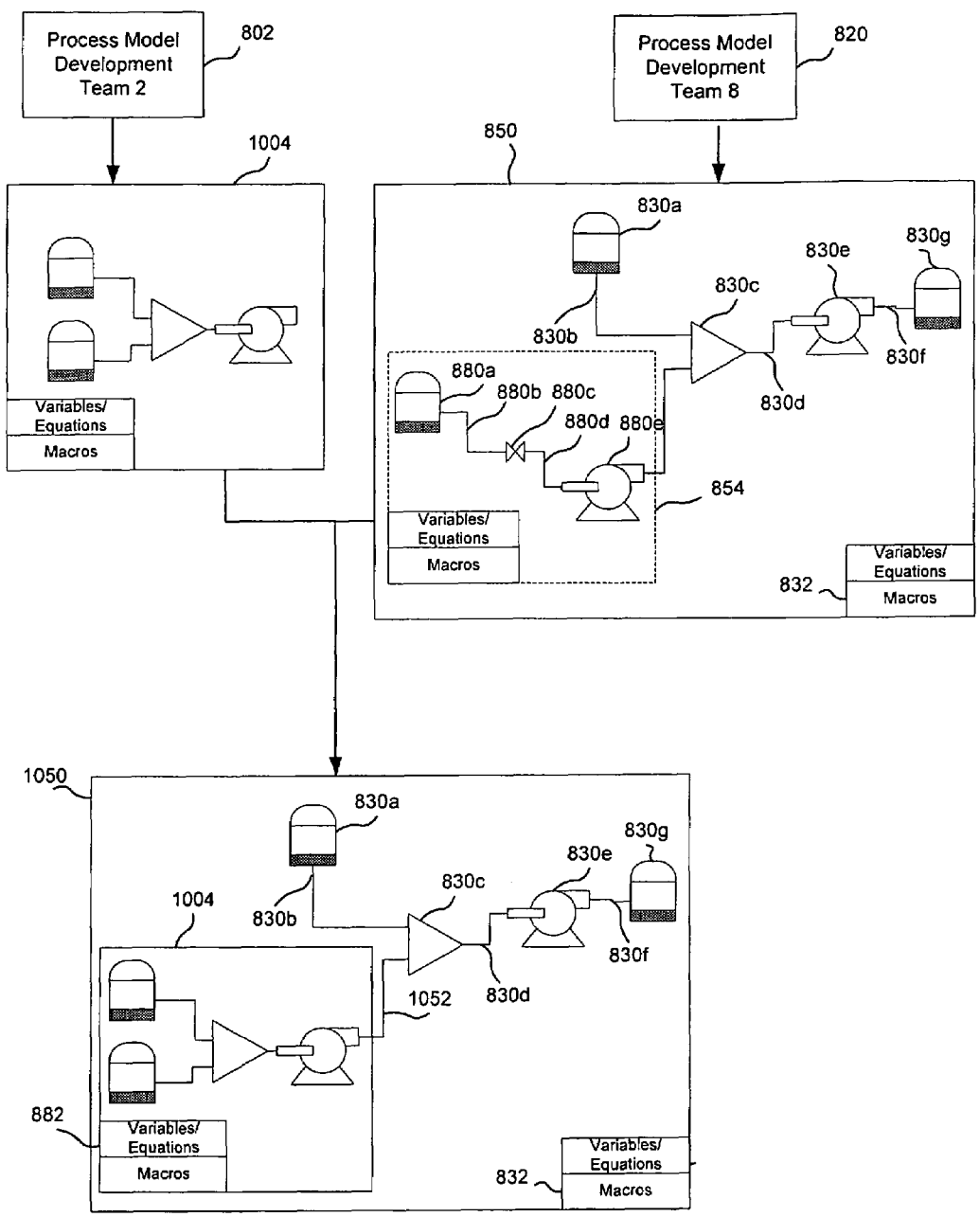
FIG. 10 is a flow diagram depicting exemplary processing of a flowsheet in accordance with one embodiment.

Referring next to FIG. 10, shown is an exemplary flow diagram depicting a re-integration of a modified flowsheet into a root flowsheet. As shown, one process development team 820 in the exemplary embodiment is continuing to use an integrated flowsheet 850, which contains the subflowsheet 854 that had previously been imported. A second process model development team 802 has created a new version 1004 of the subflowsheet 854 currently in use within the integrated flowsheet 850. As shown, the import-replace engine 704 depicted in FIG. 7 enables the original version of the subflowsheet 854 to be replaced with the new version 1004, resulting in an updated integrated flowsheet 1050. As shown, the import-replace engine 704 has automatically re-established a stream 1052 so as to connect the subflowsheet 1004 with an entry port in the root flowsheet 850.

In conclusion, the present invention provides, among other things, a system and method for developing industrial process models. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A computerized method for modular development of industrial process models comprising:

collecting a plurality of flowsheets, wherein each flowsheet includes a corresponding one of a plurality of groups of unit models;

combining the plurality of flowsheets to create a combined model, wherein each of the plurality of flowsheets maintains its identity in the combined model;

directing that a first macro associated with a first flowsheet be run;

automatically executing, in response to the directing, the first macro and other macros by the same name as the first macro;

displaying a graphical representation of the combined model;

modifying a first of the plurality of flowsheets;

recombining the first of the plurality of flowsheets with the combined model, wherein recombining the first of the plurality of flowsheets with the combined model comprises:

breaking any connections between unit models in the combined model that are duplicates of unit models in the modified first of the plurality of flowsheets;

deleting the unit models in the combined model that are duplicates of unit models in the modified first of the plurality of flowsheets;

importing the modified first of the plurality of flowsheets an as imported flowsheet; and reestablishing the imported flowsheets input/output streams that match the broken connections by both name and structure; and performing an operation on the combined model, wherein an associated operation is automatically performed on the modified first of the plurality of flowsheets.

2. The method of claim 1, wherein the plurality of flowsheets in the combined model are organized into a navigable hierarchical structure.

3. The method of claim 1, wherein automatically executing includes automatically executing the other macros, beginning with any other macro that has the same name as the first macro and is associated with a lowest hierarchical level flowsheet relative to the first flowsheet, and progressing to any other macro that has the same name as the first macro and is associated with a higher hierarchical level relative to the lowest hierarchical group, until the first macro is run.

4. The method of claim 1, wherein combining the plurality of flowsheets comprises:

importing information and objects that are local to one of the plurality of flowsheets;

determining if there are any conflicts that need to be addressed before importing global information and objects from the one of the plurality of flowsheets into a second of the plurality of flowsheets;

establishing interfaces between the one of the plurality of flowsheets and the second of the plurality of flowsheets; and creating and connecting graphical data from the one of the plurality of flowsheets to the second of the plurality of flowsheets.

5. The method of claim 4, wherein determining if there are any conflicts that need to be addressed before importing global information comprises:

determining information and naming that is global to the combined model;

resolving conflicts by giving a user an option selected from the group consisting of:

changing the one of the plurality of flowsheets to resolve a conflict, accepting suggested names for conflicting objects and providing new, non-conflicting names.

6. The method of claim 1, wherein modifying the first of the plurality of flowsheets comprises:

exporting information and objects that are local to the first of the plurality of flowsheets;

duplicating and exporting information that is global to the combined model;

localizing and exporting an interface between the first of the plurality of flowsheets and the combined model;

exporting any reference to information outside the first of the plurality of flowsheets;

importing the exported information as a stand-alone instance of an exported model; and modifying the stand-alone instance of the exported model.

7. The method of claim 1, wherein the automatically executing the first macro and other macros by the same name as the first macro is performed prior to run-time processing of the combined model.

* * * * *